E. KUHN.
DEVICE FOR FLUSHING BASINS.
APPLICATION FILED AUG. 15, 1908.

941,997.

Patented Nov. 30, 1909.
3 SHEETS—SHEET 1.

Fig. 2ª

WITNESSES
M. Van Nortwick
Parker Cook

INVENTOR
Edward Kuhn
BY George Cook
ATTORNEY

E. KUHN.
DEVICE FOR FLUSHING BASINS.
APPLICATION FILED AUG. 15, 1908.
941,997.
Patented Nov. 30, 1909.
3 SHEETS—SHEET 2.
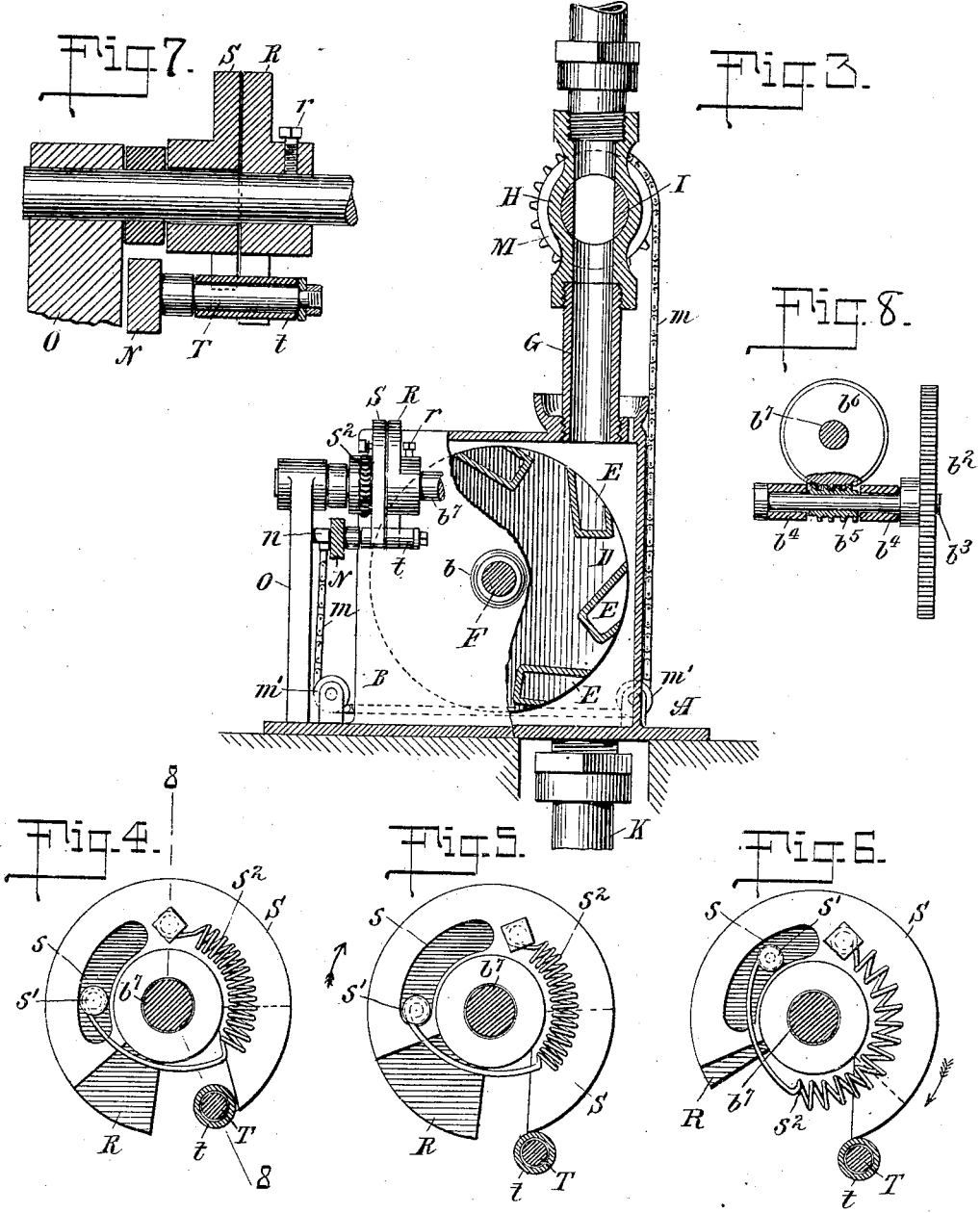

E. KUHN.
DEVICE FOR FLUSHING BASINS.
APPLICATION FILED AUG. 15, 1908.
941,997.
Patented Nov. 30, 1909.
3 SHEETS—SHEET 3.
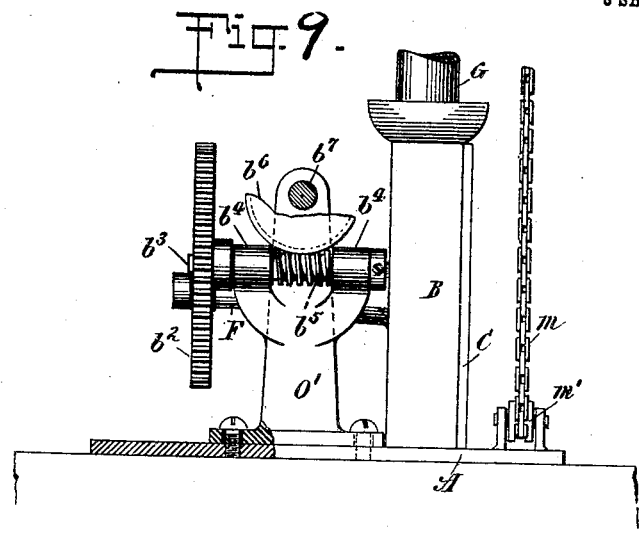
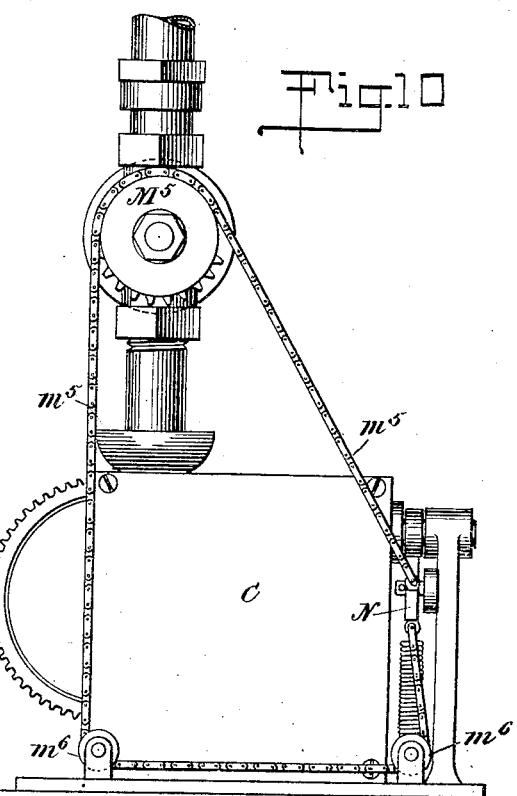
WITNESSES
INVENTOR
BY
ATTORNEY

UNITED STATES PATENT OFFICE.

EDMOND KUHN, OF EAST ORANGE, NEW JERSEY, ASSIGNOR, BY DIRECT AND MESNE ASSIGNMENTS, TO KUHN SPECIALTIES COMPANY, OF EAST ORANGE, NEW JERSEY, A CORPORATION OF NEW JERSEY.

DEVICE FOR FLUSHING BASINS.

941,997.     Specification of Letters Patent.     Patented Nov. 30, 1909.

Application filed August 15, 1908. Serial No. 448,665.

*To all whom it may concern:*

Be it known that I, EDMOND KUHN, a citizen of the United States, and a resident of East Orange, in the county of Essex and State of New Jersey, have made and invented certain new and useful Improvements in Devices for Flushing Basins, of which the following is a specification.

My invention relates to an improvement in devices for flushing basins, lavatories, and the like, the object of the same being to provide a device of this character which shall be simple and economical in construction, durable and efficient in use, certain in its operations, and which after delivering a certain or predetermined quantity of water, will automatically close.

With these and other ends in view, the invention consists in certain novel features of construction and combinations of parts, as will be hereinafter fully described and pointed out in the claims.

Figure 1:
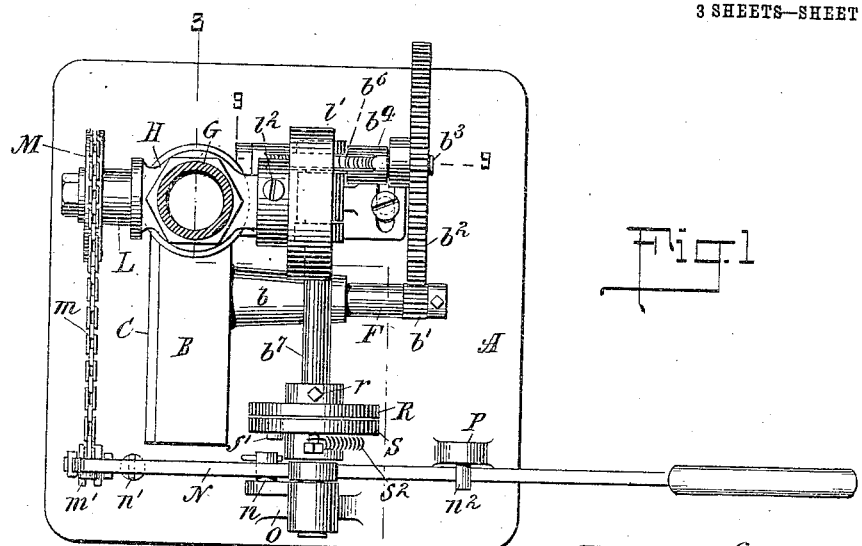
Figure 2:
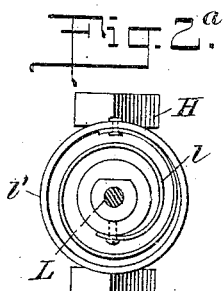
Figure 2:
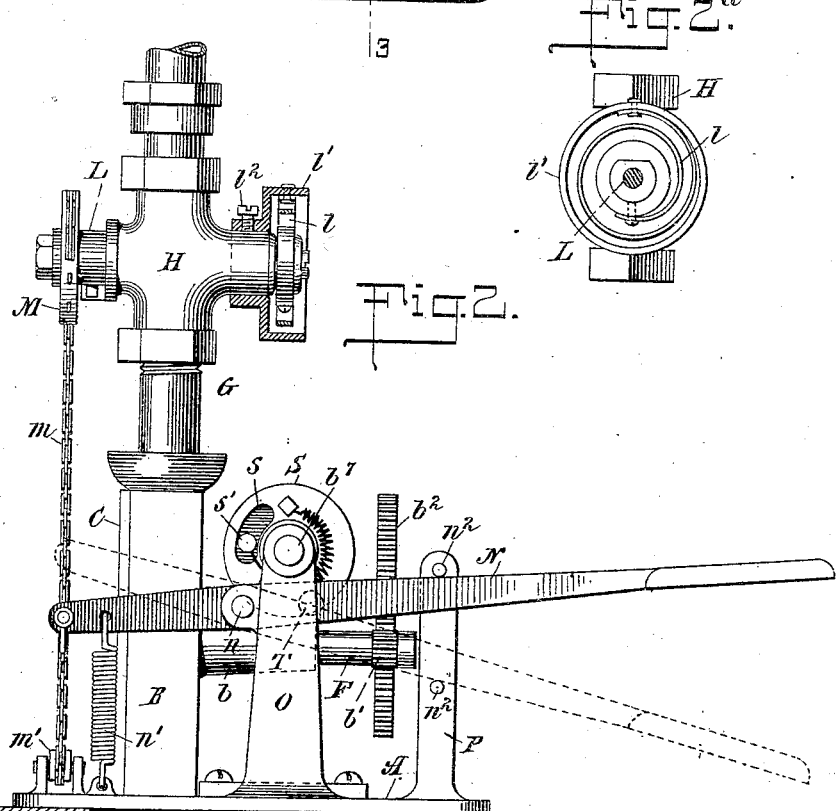

In the accompanying drawings, Figure 1 is a plan view of my improved device. Fig. 2 is a side view of the same. Fig. 2ª is a detached view of the spring for closing the valve and shutting off the water. Fig. 3 is a sectional view taken on the line 3—3 of Fig. 1. Figs. 4, 5 and 6 are views of the cams in their different positions. Fig. 7 is a sectional view of the cams taken on the line 8—8 of Fig. 4. Fig. 8 is a detached view showing a part of the transmission gear, taken on the line 9—9 of Fig. 1. Fig. 9 is a view in end elevation thereof, several of the parts being broken away for the sake of clearness. Fig. 10 is a view of a modification.

Referring to the drawings, A represents a base or stand having cast thereon or secured thereto the casing B forming part of the motor, this casing having secured thereto the removable side plate C, said base A forming the bottom of the casing. Within the casing is secured the rotor D formed with the buckets or receptacles E and mounted upon the driving shaft F; this form of water motor is old and well known, and hence needs no further description.

To the casing B is secured the end of the water supply or inlet pipe G provided with the valve chamber H containing a valve I, which when open, as illustrated in Fig. 3, permits of the flow of the water through the same and into the buckets E, causing the rotor D to rotate and in turn rotate the shaft F to which it is secured, the water being delivered from the motor to the outlet pipe K communicating with an opening in the base A below the casing B.

The valve I is provided with a valve stem L, which projects through the chamber H at either side thereof, and onto one end of which is secured the sprocket wheel M. To this sprocket is secured one end of the chain $m$, said chain passing partly around the sprocket and around the pulley $m'$ mounted on the base A, the opposite end of the chain being secured to one end of the operating handle or lever N fulcrumed at $n$ to a stud or projection formed on the post O, the latter being preferably cast integral with the base A. Near the same end of the handle or lever N is secured one end of the spring $n'$, the opposite end of said spring being secured to the base A, whereby to return and retain the handle in its normal position, as illustrated in full lines in Fig. 2, it being understood from the foregoing that when the outer end of said lever or handle is depressed or lowered, as illustrated by dotted lines, Fig. 2, the valve I, through the intervention of the chain $m$ and sprocket M will be turned or opened, as illustrated in Fig. 3, the handle or lever N being returned to its normal position by means of the spring $n'$, its upward and downward movements being limited by the pins or studs $n^2$ formed on the post P, formed on or secured to the base A. To the opposite end of the valve stem L is secured one end of the spring $l$, the opposite end of the spring being secured to the box or casing $l'$, the latter in its turn being mounted on the valve chamber H and held in position by the set screw $l^2$, the tendency of this spring being to return and hold the valve I in its closed position.

When the outer end of the handle N is lowered into the position as illustrated in dotted lines, Fig. 2, the valve I will be opened, as before described, and as illustrated in Fig. 3, the turning or rotating of the valve stem operating to wind and increase the tension of the spring $l$. When the handle is released, and returned to its normal position by means of the spring $n'$, the valve is turned and closed by the spring $l$. To alter or change the tension of this spring $l$ it is simply necessary to loosen the set screw $l^2$ and turn the box or casing $l'$ to right or left on the valve chamber, according to whether the tension of said spring is to be decreased or increased, and after properly regulating the same, to tighten the set screw to hold the parts in their proper relative positions.

On the side of the casing B is formed the sleeve $b$, affording a bearing for the shaft F which extends through and beyond the same, and on which shaft is secured the pinion $b'$. With this pinion meshes a gear $b^2$ secured to the shaft $b^3$ rotating in the sleeve bearing $b^4$, said shaft having secured thereto the worm gear $b^5$. With this worm gear meshes the gear $b^6$ secured to the shaft $b^7$ supported at one end and turning in the post O. This shaft is also supported by the post O' movably secured to the base A, as illustrated in Fig. 9 of the drawings, the journal bearing $b^4$ in which rotates the shaft $b^3$ being preferably cast in one piece with the said post O'.

From the above it will be understood that when the handle or lever N is lowered and the valve I opened, as before described, the water entering through the inlet pipe G will cause the rotor D and shaft F to rotate, which through the intervention of the pinion $b'$, gear $b^2$, worm gear $b^5$ and gear $b^6$, will also cause the shaft $b^7$ to turn or rotate. This operation of the parts will of course continue as long as the lever N is held in its lowered position. For the purpose of so holding it the required length of time, that is, to deliver a certain or given quantity of water, and to automatically release said lever to permit of its being returned to its raised position by means of the spring $n'$, and the valve closed by means of the spring $l$, I secure to the shaft $b^7$ a cam R, by means of the set screw $r$, (Fig. 1), said cam being cut away, as illustrated in dotted lines, Figs. 4, 5 and 6.

On the shaft $b^7$ is loosely mounted the cam S, provided with the concentric slot $s$, into and through which extends a pin or stud $s'$ formed on or secured to the adjacent side of the cam R, and to which stud is secured one end of the spring $s^2$, the opposite end of the said spring being secured to the cam S, said latter cam S being also cut away as shown in the several figures of the drawings. The lever N has formed on or secured thereto the pin T encircled by the sleeve or roller $t$, as illustrated in Fig. 7 of the drawings.

When the parts are in their normal positions, that is, when the outer end of the handle or lever N is raised and the valve I closed, as illustrated in full lines, Figs. 1 and 2, the cams R and S will occupy the relative positions, as illustrated in Fig. 4, that is, with the pin T resting within the openings or recesses in the cams. When the outer end of the handle or lever N is depressed and the pin T lowered therewith, the tension of the spring $s^2$ will cause the cam S to slightly rotate on the shaft $b^7$, and upon releasing the lever or handle, said pin, and the roller $t$ thereon, will bear against the periphery of the cam, as illustrated in Fig. 5.

As before described, when the outer end of the handle or lever N is depressed, the valve I is opened, as illustrated in Fig. 3, and by reason of the relative positions of the cam S and pin T, said handle will be retained in its lowered position, and the valve in its open position.

The water flowing through the pipe G and out of the pipe K to the basin or lavatory, will cause the rotor D to rotate, which as before described, will cause the shaft $b^7$ to rotate. The cam S resting on the pin T will be held in the position as illustrated in Fig. 5 until the cam R secured to the shaft $b^7$ and rotating therewith, causes the pin $s'$ to assume approximately the position as illustrated in Fig. 6. Thereupon the tension of the spring $s^2$ overcomes the friction tending to hold the loose cam S against movement, and said cam is thereby rotated into the position with relation to the fixed cam R, as illustrated in Fig. 5. The shaft $b^7$ and cams will continue to rotate until the openings therein or cut-away portions thereof register with the pin T, whereupon the tension of the spring $n'$ will cause the inner end of the handle or lever N to be lowered and said pin T to be carried up into the recess in the cams, as illustrated in Fig. 4, thus permitting the spring $l$ to close the valve I. The momentum of the rotor D will cause the cam R to continue to rotate a short distance until the cams again occupy the relative positions, as illustrated in Fig. 4. If the outer end of the lever N be again lowered and the pin T moved downwardly, the cam S, by reason of the tension of the spring $s^2$ will cause the cam S to again assume the position as illustrated in Fig. 5 and the operation above described, to be repeated. It will thus be understood that the valve I will remain open and the water allowed to flow through the motor during one complete revolution of the shaft $b^7$, the rotor D revolving a certain number of times and delivering a quantity of water in accordance with the size or number of teeth in the gears $b'$, $b^2$. If the gear $b'$ be made smaller or with a less number of teeth, or the gear $b^2$ made larger or with a greater number of teeth, a greater number of revolutions of the rotor will be rendered necessary to cause one revolution of the shaft $b^7$, thereby providing for an increased supply of water, and again, should it be necessary to decrease the supply of water for every complete operation of the machine, it is necessary only to decrease the number of teeth in the gear $b^2$ or increase the number of teeth in the pinion $b'$.

A number of minor changes might be made in the device without departing from the spirit of my invention, and hence I do not limit my claim to such, as for instance, as illustrated in Fig. 10, the two ends of the chain $m^5$ may be secured to the inner end of the lever N and passed completely around the sprocket $M^5$ and around the pulleys $m^6$, whereby the valve will be opened or closed upon lowering or raising the outer end of said lever, thereby rendering unnecessary the employment of the spring $l$ above described for closing the valve.

Having fully described my invention, what I claim as new and desire to secure by Letters Patent, is:—

1. In a device of the character described, the combination with a water motor, of a shaft secured thereto and driven thereby, inlet and outlet pipes for conveying the water to and from the same, a valve located in said inlet pipe, a lever connected with and operating said valve to open and close the same, a cam shaft $b^7$ indirectly driven by said motor shaft, a cam tightly fixed to the cam shaft and rotated thereby for releasing said lever at the completion of each rotation of the cam shaft, a cam loosely mounted on said cam shaft and adapted to engage said lever when first lowered, and a spring connected with said lever whereby to return the latter to its normal position upon being released by said fixed cam, substantially as described.

2. In a device of the character described, the combination with a water motor, of a shaft connected therewith and driven thereby, inlet and outlet pipes for leading the water to and from said motor, a valve located in said inlet pipe, a lever connected with said valve and operating when lowered to open said valve, and when raised to close the same, and provided with a pin, a cam shaft $b^7$ indirectly rotated by said motor shaft, a cam tightly fixed to said cam shaft for releasing the lever at the completion of each rotation of the cam shaft, a cam loosely mounted on said cam shaft and adapted to engage said pin when the lever is first lowered, and a spring connected with said lever and adapted to raise the same to its normal position and close said valve when released by said fixed cam, substantially as described.

3. In a device of the character described, the combination with a water motor, of a shaft connected therewith and driven thereby, inlet and outlet pipes for leading the water to and from said motor, a valve located in said inlet pipe, a lever connected with said valve and adapted to be mechanically lowered in one direction to open said valve, a cam shaft $b^7$ indirectly driven by said motor shaft, a cam tightly fixed to the cam shaft and rotated thereby for releasing said lever at the completion of each rotation of the cam shaft, a cam loosely mounted on said cam shaft, a spring connecting said cams and adapted to rotate said loose cam into engaging position with said lever when the latter is first lowered, and a spring connected with said lever and operating to raise it to its normal position when released by said fixed cam, substantially as described.

4. In a device of the character described, the combination with a water motor, of a shaft connected therewith and driven thereby, inlet and outlet pipes for leading the water to and from said motor, a valve located in said inlet pipe, a lever connected with said valve and adapted to be mechanically lowered in one direction to open said valve, a cam shaft $b^7$ indirectly driven by said motor shaft, a cam loosely mounted on said cam shaft and provided with a radial slot, a cam tightly fixed to the cam shaft and rotated thereby for releasing said lever at the completion of each rotation of the cam shaft, said tight cam being provided with a pin extending through said radial slot and in said loose cam, a spring, one end of which is connected to said pin and the opposite end to said loose cam and adapted to rotate said loose cam into engaging position with said lever when the latter is first lowered, and a spring connected with said lever whereby to return the same to its normal position when released by said fixed cam, the several parts being constructed and arranged to operate substantially as described.

Signed at New York, borough of Manhattan, in the county of New York, and State of New York, this 12th day of August, A. D. 1908.

EDMOND KUHN.

Witnesses:
M. VAN NORTWICK,
PARKER COOK.